United States Patent [19]

Henry et al.

[11] Patent Number: 4,845,180
[45] Date of Patent: Jul. 4, 1989

[54] ULTRAVIOLET LIGHT ABSORBING COMPOUNDS, COMPOSITIONS AND METHODS FOR MAKING SAME

[75] Inventors: Janis C. Henry, Newport Beach; Cary J. Reich, Laguna Hills, both of Calif.

[73] Assignee: Allergan, Inc., Irvine, Calif.

[21] Appl. No.: 171,396

[22] Filed: Mar. 21, 1988

[51] Int. Cl.$^4$ .................. C08G 18/22; C08G 18/77
[52] U.S. Cl. ........................................ 528/73; 528/54; 526/259; 524/91; 548/259; 548/260
[58] Field of Search .................. 528/73, 54; 526/259; 524/91; 548/260, 259

[56] References Cited

U.S. PATENT DOCUMENTS

| | | | |
|---|---|---|---|
| 4,021,405 | 5/1977 | Tucker et al. | 524/91 |
| 4,096,128 | 6/1978 | Frisch et al. | 528/54 |
| 4,131,571 | 12/1978 | Crawley et al. | 524/91 |
| 4,179,548 | 12/1979 | Schroeter et al. | 524/91 |
| 4,203,889 | 5/1980 | Chang et al. | 524/91 |
| 4,285,073 | 8/1981 | Szycher | 623/4 |
| 4,383,863 | 5/1983 | Dexter et al. | 548/260 |
| 4,535,104 | 8/1985 | Pyles | 548/260 |
| 4,675,352 | 6/1987 | Winters et al. | 548/260 |

Primary Examiner—Morton Foelak
Assistant Examiner—Dennis R. Daley
Attorney, Agent, or Firm—Gordon L. Peterson; Frank J. Uxa, Jr.

[57] ABSTRACT

An ultraviolet absorbing composition comprising a polymer of at least one diisocyantate, at least one polyol and at least one hydroxyl functional, polymerizable ultraviolet absorbing monomer. Included among the preferred ultraviolet absorbing monomers are compounds which have the following structure:

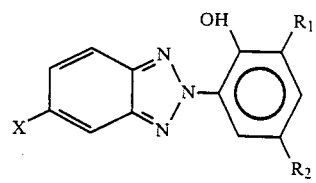

and mixtures thereof, wherein X is selected from the group consisting of H, alkoxy radicals and halogen; $R_1$ is selected from the group consisting of H and alkyl radicals, provided that at least one of X and $R_1$ is other than H; and $R_2$ is an organic radical including a functional hydroxyl group.

29 Claims, No Drawings

ULTRAVIOLET LIGHT ABSORBING COMPOUNDS, COMPOSITIONS AND METHODS FOR MAKING SAME

BACKGROUND OF THE INVENTION

This invention relates to ultraviolet light absorbing polymer compositions and more particularly, to polymer compositions including polyurethane elastomers and covalently bonded ultraviolet light absorbing components. The subject polymer compositions, which are preferably optically clear, may be used in the fabrication of ultraviolet light absorbing ocular devices such as corneal contact lenses, intraocular lenses, and corneal intrastromal implant lenses.

The incident light entering the eye is composed of the entire spectrum of wavelengths including the ultraviolet, visible, and infrared. The cornea preferentially filters ultraviolet light up to about 300 nm. The natural lens normally screens ultraviolet light in the range of about 300 nm to about 400 nm. Thus, in the eye with its natural lens in place relatively little radiation of wavelengths less than about 400 nm reaches the posterior intraocular structures, e.g., the vitreous humor and the retina.

In the aphakic individual, i.e., that individual who has had the natural crystalline lens removed, there is a loss in protection for the retina from ultraviolet light in the above-noted range. Thus, the use of ultraviolet light absorbing contact or intraocular lenses is particularly important for the aphakic person. It is further believed that ultraviolet light screening spectacles or contact lenses may retard the development of a cataract in the natural lens.

Although low molecular weight, non-polymerizable ultraviolet absorbing compounds of various types are effective in blocking ultraviolet radiation when compounded into polymer formulations, their extractability in various media may limit their utility. This problem is remedied by the synthesis of polymerizable, ultraviolet-absorbing monomers which can be covalently coupled into the polymer matrix. These covalently bonded ultraviolet light absorbing monomers are not extractable. Articles fabricated from ultraviolet light absorbing polymer compositions incorporating these polymerizable ultraviolet light absorbing monomers therefore maintain stable ultraviolet screening characteristics.

It is known that certain polymerizable derivatives of 2-(2-hydroxyphenyl)-2H-benzotriazole are efficient ultraviolet light absorbing species that can be copolymerized into a variety of polymeric materials. Commonly assigned, co-pending application Ser. No. 109,727, filed Oct. 16, 1987, discloses ultraviolet light absorbing compositions derived from vinyl functional monomers and certain vinyl functional, ultraviolet light absorbing derivatives of 2-(2-hydroxyphenyl)-2H-benzotriazole. Commonly assigned, co-pending application Ser. No. 122,945, filed Nov. 19, 1987), discloses silicone elastomers which include covalently bonded UV light absorbing components. Each of these latter two applications is incorporated in its entirety by reference herein.

In *J. Macromol Sci.-Chem.* A 22(4), p. 382-402 (1985), Dickstein and Vogl disclose 2-(2-hydroxy-5-vinylphenyl)-2H-benzotriazole being co- and terpolymerized with N-vinylpyrrolidone and various methacrylic esters. The polymerizations result in polymers from which the ultraviolet light absorbing component cannot be extracted or leached out. The polymers have water absorption behavior similar to that of co- and terpolymers without the incorporation of the ultraviolet light absorbing component.

Beard, et al, U.S. Pat. No. 4,528,311, discloses ultraviolet light absorbing polymer compositions comprising copolymers of 2-(2hydroxy-5-acrylyloxyphenyl)-2H-benzotriazoles with one or more other vinyl monomers, specifically acrylic monomers such as methyl methacrylate. This patent also discloses that such benzotriazole compounds may be used as additives to a wide variety of organic polymers, including polyurethanes and polyureas, to impart ultraviolet light absorbing properties to the polymer, which is useful in the manufacture of ocular devices. In example 4, the preparation of the intermediate 2-(2-hydroxy-5-hydroxypropyl-3-t-butylphenyl)-5-chloro-2H-benzotriozole is disclosed. There is no indication, however, of a benzotriazole-type compound having a single reactable hydroxyl group which is functional in a polymerization reaction with polyurethanes or polyurethane-ureas.

Besecke, et al U.S. Pat. No. 4,612,358 discloses the use of certain benzotriazole derivatives, in particular 2-(2-hydroxy-3-methacrylamidomethyl-5-t-octyphenyl) benzotriazole, having ultraviolet light absorbing properties in polymers with unsaturated vinyl or vinylidene monomers. Besecke et al does not disclose benzotriazole-type compounds having a hydroxyl group which is functional in a polymerization reaction.

Szycher U.S. Pat. Nos. 4,131,604 and 4,285,073 disclose polyurethane compositions useful as bladders for heart pumps, and as artificial cornea and permanently implantable lenses, respectively. Neither patent discloses any benzotriazole compound nor any ultraviolet light absorbing component.

Other U.S. Patents which were considered in preparing this application are U.S. Pat. Nos. 4,304,895, 4,390,676, 4,636,212 and 4,158,030.

Materials used to manufacture ocular devices, such as contact lenses, intraocular lenses and corneal intrastromal implant lenses should be capable of absorbing ultraviolet light for the aphakic patient. The ultraviolet light absorber should be capable of absorbing radiation in the range of about 300 nm to about 400 nm.

SUMMARY OF THE INVENTION

New ultraviolet light absorbing compounds and compositions have been discovered. These compositions comprise a polymer of at least one diisocyanate, at least one polyol and at least one hydroxy functional, polymerizable ultraviolet absorbing monomer. These compositions, which may be termed polyurethane-type polymers, preferably can be used to absorb radiation in the wavelength range of about 300 nm to about 400 nm. The compositions are preferably optically clear and can be utilized for the manufacture of contact lenses, intraocular lenses, corneal intrastromal lenses and the like. There is no significant extraction of the ultraviolet light absorbing component, e.g., during normal use of the compositions or lenses, from the polymer.

In one embodiment, the ultraviolet light absorbing monomers that are useful in producing the present compositions comprise hydroxy functional, polymerizable ultraviolet light absorbing benzotriazole monomers having the following structure or formula:

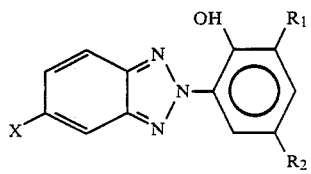

and mixtures thereof, wherein X is selected from the group consisting of H, alkoxy radicals, preferably containing 1 to about 6 carbon atoms, and halogen, $R_1$ is selected form the group consisting of H and alkyl radicals, preferably containing 1 to about 8 carbon atoms, provided that at least one of X and $R_1$ is other that H, and $R_2$ is an organic radical which includes a functional hydroxyl group. The alkoxy radical is preferably a methoxy radical and the alkyl radical is preferably selected from the group consisting of methyl radical and t-alkyl radicals containing 4 to about 6 carbon atoms. The $R_2$ radical preferably contains about 2 to about 10 carbon atoms. $R_2$ is preferably aliphatic. The present compositions, including the covalently bonded ultraviolet light absorbing component, preferably are capable of absorbing ultraviolet light in the range of about 300 nm to about 400 nm.

The ultraviolet light absorbing compositions of the present invention are preferably optically clear, stable materials useful in the fabrication of corneal contact lenses, intraocular lenses, and corneal intrastromal lenses. About 0.1% to about 5%, more preferably less than about 1%, by weight of the ultraviolet light absorbing component is preferably included in the composition to yield the appropriate ultraviolet blocking efficiency, e.g., in samples of thickness comparable to the final lens product. For example, the ultraviolet light absorbing compositions of the present invention can be formulated to completely block ultraviolet radiation in the range of about 300 nm to about 390 nm and to display about 2% to about 20% transmittance at 400 nm for 0.75 mm thick samples.

DETAILED DESCRIPTION

The present invention relates to an ultraviolet light absorbing composition comprising a polyurethane-type polymer of at least one diisocyanate, at least one polyol and at least one of certain hydroxyl functional, polymerizable ultraviolet-absorbing monomers.

Polyurethane polymers are normally addition products between one or more diisocyanates and one or more dihydroxyl or trihydroxyl functional compounds. A diisocyanate is a compound having two functional isocyanate groups. At least one hydroxyl-containing compound preferably is a difunctional macromolecular glycol.

Any suitable diisocyanate may be utilized in preparing the present compositions. Examples of the diisocyanates useful in the present invention include aliphatic organic diisocyanates such as bicyclohexyl methane-4,4'-diisocyanate, hexamethylene diisocyanate, isophorone diisocyanate, trimethyl hexamethylene diisocyanate, dimer acid diisocyanate and the like. Preferably the diisocyanate is bicyclohexyl methane-4,4'-diisocyanate.

Any suitable difunctional polyol or mixture of such polyols may be utilized in preparing the present polyurethane-type polymer compositions. In one embodiment, the polyol is preferably polytetramethylene ether glycol having the following formula:

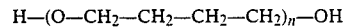

$$H-(O-CH_2-CH_2-CH_2-CH_2)_n-OH$$

where n is chosen so that the average molecular weight of the glycol is in the range of about 500 to about 5000, more preferably about 1000 to about 3000, and especially about 2000.

Other polyols may be utilized in producing the present polyurethane-type polymers. For example, low molecular weight glycols are useful as chain extenders. The low molecular weight glycol preferably has a molecular weight in the range of about 80 to about 300. Examples include ethylene glycol, diethylene glycol, propylene glycol, dipropylene glycol, neopentyl glycol, cyclohexane dimethanol, 1,4-butanediol and the like, with 1,4-butanediol being particularly preferred.

It may be desired to add a crosslinking agent to the monomer mix. A low molecular weight polyhydric (i.e., tri-hydric or higher) alcohol is suitable. Examples of such polyhydric alcohols include glycerol, pentaerythritol, trimethylolethane, trimethylolpropane, mannitol and the like, with trimethylolpropane being preferred.

The diisocyanate, polyol(s) and ultraviolet light absorbing monomer are provided in the amounts needed to achieve the desired polyurethane-type polymer.

A catalyst may be employed to promote the curing of the polymer. Conventioinal catalysts may be employed and include, for example, trimethylamine, triethylamine, N-methyl morpholine, zinc octoate, dibutyl tin dilaurate and the like, with dibutyl tin dilaurte being preferred.

The ultraviolet light absorbing component covalently included in the polyurethane-type polymer does not leach out to interfere with the ultraviolet light absorbing properties of the composition.

In one embodiment, the ultraviolet absorbing monomer is selected from the group of compounds having the following structure or formula:

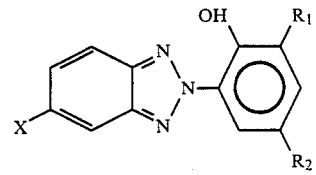

and mixtures thereof, wherein X is selected from the group consisting of H, alkoxy radicals, preferably containing 1 to about 6 carbon atoms, and halogen, $R_1$ is selected from the group consisting of H and alkyl radicals, preferably containing 1 to about 8 carbon atoms, more preferably selected from the group consisting of methyl radicals and t-alkyl radicals containing 4 to about 6 carbon atoms, provided that at least one of X and $R_1$ is other than H, and $R_2$ is an organic radical having a terminal functional hydroxyl group. Preferably $R_2$ is $-(CH_2)_mCH_2-OH$ where m is 0 to about 4, more preferably 1 or 2. Typically, the substituted benzotriazoles useful in the present invention absorb ultraviolet light strongly in the range of about 300 nm to about 400 nm, and exhibit reduced absorption at wavelengths higher than about 400 nm.

A specific preferred ultraviolet light absorbing monomer is 2-(2-hydroxy-3-t-butyl-5-(2-hydroxyethyl)-phenyl)-5-chloro-2H-benzotriazole. One particularly preferred method for producing 2-(2-hydroxy-3-t-butyl-5-(2-hydroxyethyl)phenyl)-5-chloro-2H-benzotriazole is described in Examples 1 to 7 herein. Other useful substituted ultraviolet light absorbing monomers may be produced using analogous synthesis schemes.

Preferably, the amount of the ultraviolet light absorbing monomer incorporated in the ultraviolet light absorbing composition of the present invention is less than about 5% by weight and more preferably about 1% or less by weight, especially about 0.05% to about 1% by weight, based on the total composition. Of course, it is understood that the ultraviolet light absorbing monomer is not present as such in the composition, but is part of the polymer. However, for convenience and simplicity, in certain instances herein the ultraviolet light absorbing monomer is referred to as being present in the polymer. The percentages of ultraviolet light absorbing monomer in the polymer referred to herein mean the percent of such monomer based on the total monomers used to produce the composition. The amount of ultraviolet light absorbing monomer included in the monomer mixture is that required to give the degree of light absorption desired and is dependent, for example, on the specific ultraviolet light absorbing monomer or monomers employed, the specific diisocyanate and polyol monomers employed and on the thickness of the lens to be made from the polymeric composition. By Beers Law of Absorption, the required amount of absorber is inversely proportional to the optical path length through the lens device. It is often desired that the light transmission at 400 nm be less than about 10 to 20% of the incident light and at 390 nm be less than about 3%. The light transmission in the 410–450 nm range often should not be reduced below about 50% of the total light.

The present compositions may be prepared in any suitable manner, including various procedures conventionally utilized to produce polyurethanes. The hydroxyl functional, ultraviolet light absorbing monomer is conveniently included with the polyol or polyols used to produce the composition. In one embodiment, the polyurethane-type compositions of the present invention are prepared from two materials, for convenience identified as Part A and Part B.

Part A preferably is the diisocyanate. Part B preferably includes the remainder of the monomers, e.g., the polyol(s), the chain extender(s), the crosslinking agent(s), the catalyst(s), and the hydroxyl functional ultraviolet light absorbing monomer(s). The desired stoichiometric proportions of Parts A and B are thoroughly mixed together.

The air which is introduced during the mixing of the Part A-B mixture is removed, e.g., using vacuum. The mixture is then placed into a mold. The filled mold is placed in an oven, preferably at a temperature of at least about 100° C. for a period of time, preferably about 4 to about 24 hours, unitl the composition is cured.

In an alternate embodiment, a macroglycol, e.g., polytetramethylene ether glycol, is used and is added slowly to Part A. After all the macroglycol is added, the catalyst is added and the mixture is held at a slightly elevated temperature, preferably about 60° C. to about 90° C., with continuous agitation for a period of time, preferably in the range of about 2 hours to about 8 hours to produce a relatively low molecular weight polymer, i.e., prepolymer.

This prepolymer is degassed and the remainder of the Part B components are mixed with the prepolymer using agitation. The mixture is degassed and placed in the desired mold. The mold is placed in an oven, preferably at a temperature of at least about 100° C. for a period of time preferably in the range of about 4 to about 24 hours, unitl the composition is cured.

In any event, the polyurethane-type composition of the present invention, including the covalently bonded ultraviolet light absorbing component, provide the desired degree of ultraviolet blocking ability.

The invention will be further described in connection with the following examples which are set forth for purposes of illustration only and in which proportions are by weight and temperatures are in degrees centigrade unless specifically stated to the contrary.

A quantity of the UV light absorbing monomer, 2-(2-hydroxy-3-t-butyl-5-(2-hydroxyethyl)phenyl)-5-chloro-2H-benzotriazole, was produced as follows. The starting material is 2-(2-hydroxy-3-t-butyl-5-methylphenyl)-5-chloro-2H-benzotriazole, hereinafter identified as "I", which is commercially available.

Unless otherwise noted, all solvents and reagents were ACS reagent grade and were used without further purification. The TLC Rf values were obtained on Analtech Silica GHLF plates and eluted with 100 percent reagent grade $CHCl_3$.

EXAMPLE 1

Preparation of 2-(2-acetoxy-3-t-butyl-5-methylphenyl)-5-chloro-2H-benzotriazole, hereinafter identified as "II"

One mole (315 gms) of I was suspended in 1250 mls of acetic anhydride and 10 mls concentrated $H_2SO_4$. The suspension was stirred at 75° C. for 3 hours. The system was homogeneous when heated. The suspension was cooled to room temperature and then refrigerated several hours. II was collected by vacuum filtration. The solid was suspended in 1 liter of water saturated with $NaHCO_3$ and stirred for one half hour. The solid was recollected, washed several times with distilled water, and dried at 50° C. and 29 in. Hg for several hours.

Product: a white powder, M.P. 130°–132° C., $R_f=0.60$.

EXAMPLE 2

Preparation of 2-(2-acetoxy-3-t-butyl-5-dibromomethylphenyl)-5-chloro-2H-benzotriazole, hereinafter identified as "III"

320 gms of II was suspended in 1300 mls of $CCl_4$ in a reaction kettle fitted with a condenser, stirrer, heat source, drying tube and light source. The mixture was brought to near reflux and 336 gms of N-Bromosuccinimide was added. After 15 minutes, approximately 0.5 gms of an azobisisobutyronitrile (AIBN) initiator, Vazo 64, sold by DuPont was added. The reaction was allowed to proceed at reflux for 4 to 6 hours. If the pale orange color of bromine disappeared, an additional 0.25 gm of AIBN was added, and the reaction continued for another 2 hours. The hot reaction mixture was filtered to remove the succinimide. The $CCl_4$ solution was cooled to room temperature and then refrigerated for several hours. III was collected by filtration, washed with 200 mls $CCl_4$, and dried at 50° C., 20 in, Hg for several hours.

Product: a white powder, M.P. 162°–163° C., $R_f=0.61$.

EXAMPLE 3

Preparation of
2-(2-acetoxy-3-t-butyl-5-formylphenyl)-5-chloro-2H-benzotriazole, hereinafter identified as "IV"

323 gms of III was suspended in 725 mls dimethoxy ethane (glyme) in a reaction kettle fitted with a heating mantle, stirrer, condenser, and addition funnel. The mixture was heated to near reflux and became homogeneous. A solution of 219 gms $AgNO_3$ in 120 mls $H_2O$ was slowly added at a rate which maintained a mild reflux (2 drops/second). The reaction mixture became cloudy and AgBr precipitated as a pale green solid. The AgBr was removed by filtration, and 200 mls of glyme was added to the remaining mixture. Approximately one half of the glyme was removed with a rotary evaporator. Two volumes of $CHCl_3$ was added and the mixture was then washed with distilled water until the wash was neutral to pH paper. The mixture was then dried over $MgSO_4$, filtered and the solvent was removed by rotary evaporation. The solid crude IV was washed with distilled water and dried for several hours at 50° C., in vacuo.

Product: a pale yellow solid, M.P. 129°–131° C., $R_f=0.32$.

EXAMPLE 4

Preparation of
2-(2-acetoxy-3-t-butyl-5-(1-hydroxyethyl)phenyl)-5-chloro-2H-benzotriazole, hereinafter identified as "V"

A solution of 163 gms of IV and 650 mls of dry tetrahydrofuran (THF) in a dry reaction kettle fitted with stirrer, condenser, drying tube, addition funnel, and dry nitrogen purge was prepared. 0.6 moles methyl Grignard in diethyl ether (214 mls of 2.8M methyl magnesium bromide) was transferred under anhydrous conditions to the addition funnel. The Grignard reagent solution was slowly added to the solution of IV so that a moderate reflux was maintained. This reflux was continued for an additional 15 minutes after the final addition was made. The reaction mixture was cooled. 90 mls of a saturated $NH_4Cl$ aqueous solution was slowly added. The solid was filtered from the hot THF/ether solution and then the solvent was removed by rotary evaporation. The resulting orange-yellow oil was dissolved in $CHCl_3$ and the solution was dried over $MgSO_4$. The $CHCl_3$ was removed by rotary evaporation.

Product: a brown-orange solid, M.P. 132°–141° C.

EXAMPLE 5

Preparation of
2-(2-hydroxy-3-t-butyl-5-(1-hydroxyethyl)phenyl)-5-chloro-2H-benzotriazole, hereinafter identified as "VI"

153 gms of V was dissolved in a solution of 60 mls of $H_2O$, 540 mls of ethanol, and 35 gms of KOH. The solution was refluxed for 3 hours and stirred several hours at room temperature. The alcohol was removed at reduced pressure using a rotary evaporator. 100 mls of distilled water was added and enough HCl was added to bring the pH to 6. 100 mls $CHCl_3$ was added to the mixture which was then stirred until the solids were dissolved. The water layer was extracted three times with $CHCl_3$. The combined $CHCl_3$ extracts were dried over $MgSO_4$. The $CHCl_3$ was removed by rotary evaporation.

Product: a yellow-orange solid, M.P. 60°–66° C., $R_f=0.18$.

EXAMPLE 6

Preparation of
2-(2-hydroxy-3-t-butyl-5-vinylphenyl)-5-chloro-2H-benzotriazole, hereinafter identified as "VII"

103 gms of VI was dissolved in 500 mls of N,N dimethyl acetamide. 0.1 gm of picric acid and 50 gms of freshly fused and ground $KHSO_4$ was added. The mixture was refluxed for one-half hour. The product was cooled and transferred to 500 mls of cold distilled water. The precipitated yellow solid was collected by vacuum filtration and washed with methanol. The solid was recrystallized 2 times in 1:5 (by volume) $CHCl_3:CH_3OH$. 30 gms of the recrystallized product was dissolved in a minimal volume of 25/75 (by volume) $CHCl_3$/hexane solution. A liquid chromatography column was packed with 300 gms silica gel and the $CHCl_3$/hexane solution was eluted therethrough. Pure 2-(2-hydroxy-3-t-butyl-5-vinylphenyl)-5-chloro-2H-benzotriazole was collected in approximately the first 500 mls of elute. The $CHCl_3$ was removed using a rotary evaporator at room temperature.

EXAMPLE 7

Preparation of
2-(2-hydroxy-3-t-butyl-5-(2-hydroxyethyl)phenyl)-5-chloro-2H-benzotriazole, hereinafter identified as "VIII"

All glassware (1 liter 3-necked round bottom flask, 250 ml addition funnel, water-cooled condenser, drying tube, and a glass stopper) was heated in an oven at 140° C. for four hours. While still hot, the addition funnel and condenser were fitted with a septum and calcium chloride drying tube respectively, and the glassware was assembled under a nitrogen atmosphere. After all glassware cooled to room temperature, 11.7 g (35.7 mmol) of VII was added to the flask. Anhydrous diethyl ether (400 ml) was added and the temperature of the mixture raised to produce a mild reflux. After complete dissolution of VII, 150 ml (75.0 mmol) of 0.5M 9-borabicyclo [3.3.1] nonane in THF was transferred under anhydrous conditions to the addition funnel and added, dropwise, over 45 minutes. After an additional 1.5 hours, the reflux was terminated and the reaction mixture allowed to cool slightly.

Methanol (100 ml) was added, followed by 29.8 ml (179 mmol) of 6N sodium hyroxide solution. To this dark red solution was added, over 20 minutes, 37 ml (357 mmol) of 30% hydrogen peroxide. The orange-colored reaction mixture was subsequently refluxed for 1.5 hours. After cooling to room temperature, the mixture was acidified with 3N hydrochloric acid until the aqueous layer was pH=6 (approximately 30 ml). The yellow-colored mixture was placed in a separatory funnel and both layers separated. The aqueous layer was washed two times with 25 ml portions of ether. All organic layers were combined and washed three times with 25 ml portions of pure water, three times with saturated sodium chloride solution, and dried over magnesium sulfate.

The drying agent was filtered and the solvent removed under reduced pressure to give a gold-colored oil. Petroleum ether (15 ml) was added and after a few minutes, with swirling, a yellow solid developed. Product was obtained by recrystallizing the solid from 400 ml methanol. The pure product was collected and washed five times with 20 ml portions of chilled methanol.

Product: a solid, pale yellow crystal product, M.P. 131°–131.5° C., $R_f=0.21$.

EXAMPLE 8

A commercially available, two part polyurethane system was selected for testing. This ophthalmic-grade polyurethane is sold under the trademark Tecoflex 2-OG by Thermedics of Woburn MA. Certain aspects of this system may be disclosed in U.S. Pat. No. 4,285,073.

This system came in two parts: (1) a diisocyanate, Part A; and (2) a mixture of polyols with a catalyst, Part B. The diisocyanate was bicyclohexyl methane-4,4'-diisocyanate. Part B included polytetramethylene ether glycol, glyoxylated trimethylol propane; and possibly butanediol. The catalyst is believed to have been dibutyl tin dilaurate. An amount of 2-(2-hydroxy-3-t-butyl-5-(2-hydroxyethyl)phenyl)-5-chloro-2H-benzotriazole (0.64 parts to 100 parts by weight of Part B) was added to Part B.

The polyurethane was prepared by mixing warm (100° C.) Part B with Part A in a weight ratio of 100:28. The laboratory sized batch was hand-mixed vigorously for two minutes and then transferred to a second container for a three to five minute degassing.

The degassed material was transferred to a preheated (100° C.) mold made of polypropylene which was kept hot while the material was being poured. The material in the mold was cured into a crosslinked polyurethane-type polymer by maintaining the mold at 110° C. for 18 to 20 hours.

EXAMPLE 9

A second two part polyurethane system was formulated for testing. This system included the following components:

|  | Wt. Parts |
| --- | --- |
| PART A |  |
| bicyclohexyl methane 4,4' diisocyanate |  |
| PART B |  |
| Polytetramethylene ether glycol | 100 |
| Trimethylolpropane | 2.2 |
| Butanediol | 3.3 |
| Dibutyl tin dilaurate | 0.002 |
| 2-(2-hydroxy-3-t-butyl-5-(2-hydroxyethyl)phenyl)-5-chloro-2H—benzotriazole | 0.67 |

The mixing of Parts A and B, and the curing of this mixture was performed in a manner similar to that described in Example 2 to produce a polyurethane-type polymer.

EXAMPLE 10

The polyurethane-type products from Examples 8 and 9, which were both optically clear and useful to produce corneal contact lenses, intraocular lenses and corneal intrastromal lenses, were subjected to various standard tests of certain physical and chemical properties. Results of these tests are set forth below.

|  | Example 8 | Example 9 |
| --- | --- | --- |
| Tensile strength, psi | 900 | 1354 |
| Elongation at break | 464% | 540% |
| Tear strength, pli (Tear Die C) | 140 | 142 |
| Hardness shore A | 64 ± 2 | 57 ± 2 |
| Refractive index | 1.483 | 1.486 |
| Specific gravity | 1.00 | 1.00 |
| Ultraviolet and visible light transmission characteristics | Both polymers have greater than 90% transmission of light in the 425–700 nm range and less than 5% transmission of light in the 300–400 nm range. | |
| Polymer extracted by $CH_2Cl_2$ in 48 hours, % | 3.8 | 24.3 |
| Benzotriazole derivative extracted by $CH_2Cl_2$ in 48 hours, % of total derivative in formulation | 0.009 | 0.014 |
| Diisocyanate extracted by $CH_2Cl_2$ in 48 hours, % of total diisocyanate in formulation | 0.002 | 0.006 |
| Polymer extracted by water in 48 hours, % | nondetected | nondetected |

These results indicate that the polyurethane products from both Examples 8 and 9 are useful to produce the ocular devices described herein. Importantly, each of these products includes an effective amount of covalently bonded ultraviolet light absorbing component which is substantially nonextractable.

EXAMPLE 11

An ultraviolet light absorbing polymer is produced as follows.

The components that are used to produce this polymer are the same as set forth in Example 9, except that each of the components of Part B are provided separately.

The polytetramethylene ether glycol is added slowly to Part A to promote capping rather than extension. After all the polytetramethylene ether glycol is added, the dibutyl tin dilaurate is added. The mixture is held at 80° C. with continuous stirring for about four hours during which time a relatively low molecular weight polymer, i.e., prepolymer, is produced.

This prepolymer is cooled to room temperature, then reheated to 85° C. and degassed. The remainder of the Part B components is mixed with the prepolymer and the mixture is degassed. The mixture is then poured into a mold and cured at 110° C. for 18 to 20 hours.

The resulting polymer product is optically clear, meets ultraviolet light absorbing specifications for ocular devices and is useful in the manufacture of such devices.

While this invention has been described with respect to various specific examples and embodiments, it is to be understood that the invention is not limited thereto and that it can be variously practiced within the scope of the following claims.

What is claimed is:

1. An ultraviolet absorbing composition comprising a polymer of at least one diisocyanate, at least one polyol and at least one hydroxyl functional, polymerizable ultraviolet light absorbing monomer selected from the group of compounds having the following structure:

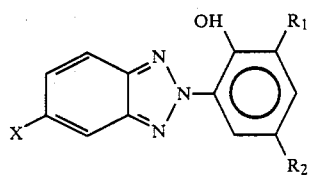

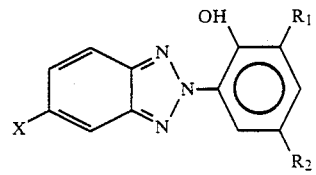

and mixtures thereof, wherein X is selected from the group consisting of H and alkyl radicals and halogen; $R_1$ is selected from the group consisting of H and alkyl radical, provided that at least one of X and $R_1$ is other than H; and $R_2$ is an organic radical including a functional hydroxyl group, said composition being optically clear.

2. The composition of claim 1 wherein said composition is effective to absorb ultraviolet light in the range of about 300 nm to about 400 nm.

3. The composition of claim 1 wherein said ultraviolet light absorbing monomer has a terminal functional hydroxyl group.

4. The composition of claim 1 wherein $R_2$ contains 2 to about 10 carbon atoms.

5. The composition of claim 1 wherein $R_2$ is aliphatic.

6. The composition of claim 1 wherein $R_2$ contains two carbon atoms.

7. The composition of claim 5 wherein $R_2$ is —(CH$_2$)$_m$—CH$_2$—OH, wherein m is 0 to about 4.

8. The composition of claim 1 wherein $R_1$ is selected from the group consisting of alkyl radicals containing 1 to about 8 carbon atoms.

9. The composition of claim 1 wherein $R_1$ is selected from the group consisting of t-alkyl radicals containing from 4 to 6 carbon atoms.

10. The composition of claim 1 wherein $R_1$ is a t-butyl radical.

11. The composition of claim 1 wherein said ultraviolet light absorbing monomer is 2-(2-hydroxy-3-t-butyl-5-(2-hydroxyethyl)phenyl)-5-chloro-2H-benzotriazole.

12. The composition of claim 1 wherein said ultraviolet light absorbing monomer is included in said polymer in an amount in the range of about 0.1% to about 10% by weight of said polymer.

13. The composition of claim 1 wherein said ultraviolet absorbing monomer is included in said polymer in an amount in the range of about 0.1% to less than about 1% by weight of said polymer.

14. The composition of claim 1 wherein said diisocyanate is selected from the group of aliphatic organic diisocyanates and mixtures thereof; and said polyol is selected from the group consisting of dihydroxyl functional compounds, trihydroxyl functional compounds and mixtures thereof.

15. The composition of claim 1 which further comprises a cross-linking agent.

16. A method for producing a polymer comprising combining at least one diisocyanate, at least one polyol and at least one hydroxyl functional, polymerizable ultraviolet absorbing monomer at effective polymerization conditions to form an optically clear polymer, said ultraviolet absorbing monomer being selected from the group of compounds having the following structure:

and mixtures thereof, wherein X is selected from the group consisting of H, alkoxy radicals and halogen; $R_1$ is selected from the group consisting of H and alkyl radicals, provided that at least one of X and $R_1$ is other than H; and $R_2$ is an organic radical including a functional hydroxyl group.

17. The method of claim 16 wherein said ultraviolet absorbing monomer has a terminal, functional hydroxyl group.

18. The method of claim 16 wherein $R_2$ is aliphatic.

19. The method of claim 16 wherein $R_2$ contains 2 to about 10 carbon atoms.

20. The method of claim 16 wherein $R_2$ contains two carbon atoms.

21. The method of claim 18 wherein $R_2$ is —(CH$_2$)$_m$—CH$_2$—OH, wherein m is 0 to about 4.

22. The method of claim 16 wherein said ultraviolet absorbing monomer is 2-(2-hydroxy-3-t-butyl-5-(2-hydroxyethyl)phenyl)-5-chloro-2H-benzotriazole.

23. A method for producing a polymer comprising combining at least one diisocyanate and at least one polyol at effective polymerization condition to produce a relatively low molecular weight polymer; and combining said relatively low molecular weight polymer with at least one polyol and at least one hydroxyl functional, polymerizable ultraviolet absorbing monomer at effective polymerization conditions to form an optically clear polymer, said ultraviolet absorbing monomer being selected from the group of compounds having the following structure:

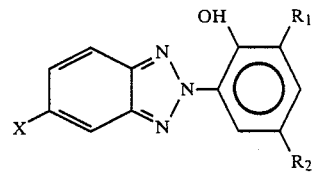

and mixtures thereof, wherein X is selected from the group consisting of H, alkoxy radicals and halogen; $R_1$ is selected from the group consisting of H and alkyl radicals, provided that at least one of X and $R_1$ is other than H; and $R_2$ is an organic radical including a functional hydroxyl group.

24. The method of claim 23 wherein said ultraviolet absorbing monomer has a terminal, functional hydroxyl group.

25. The method of claim 23 wherein $R_2$ is aliphatic.

26. The method of claim 23 wherein $R_2$ contains 2 to about 10 carbon atoms.

27. The method of claim 23 wherein $R_2$ contains two carbon atoms.

28. The method of claim 23 wherein the composition of claim 5 wherein $R_2$ is —(CH$_2$)$_m$—CH$_2$—OH, wherein m is 0 to about 4.

29. The method of claim 23 wherein said ultraviolet absorbing monomer is 2-(2-hydroxy-3-t-butyl-5-(2-hydroxyethyl)phenyl)-5-chloro-2H-benzotriazole.

* * * * *

UNITED STATES PATENT AND TRADEMARK OFFICE
CERTIFICATE OF CORRECTION

PATENT NO.    : 4,845,180
DATED         : July 4, 1989
INVENTOR(S)   : Henry et al It is certified that error appears in the above-identified patent and that said Letters Patent is hereby corrected as shown below:

```
Column 3, line 13 change "form" to --from--
Column 3, line 37 change "product" to --products--
Column 11, line 11 change "and alkyl" to --alkoxy--
Column 11, line 13 change "radical" to --radicals--
Column 11, line 22 after "terminal" insert --,--
```

Signed and Sealed this

Thirteenth Day of November, 1990

Attest:

HARRY F. MANBECK, JR.

*Attesting Officer*    *Commissioner of Patents and Trademarks*